March 14, 1950 — L. W. JEDEKA — 2,500,358
PRESSURE SHOE STRUCTURE FOR KINETOGRAPHS
Filed July 14, 1949 — 2 Sheets-Sheet 1

LLOYD W. JEDEKA,
INVENTOR.

BY
ATTORNEYS.

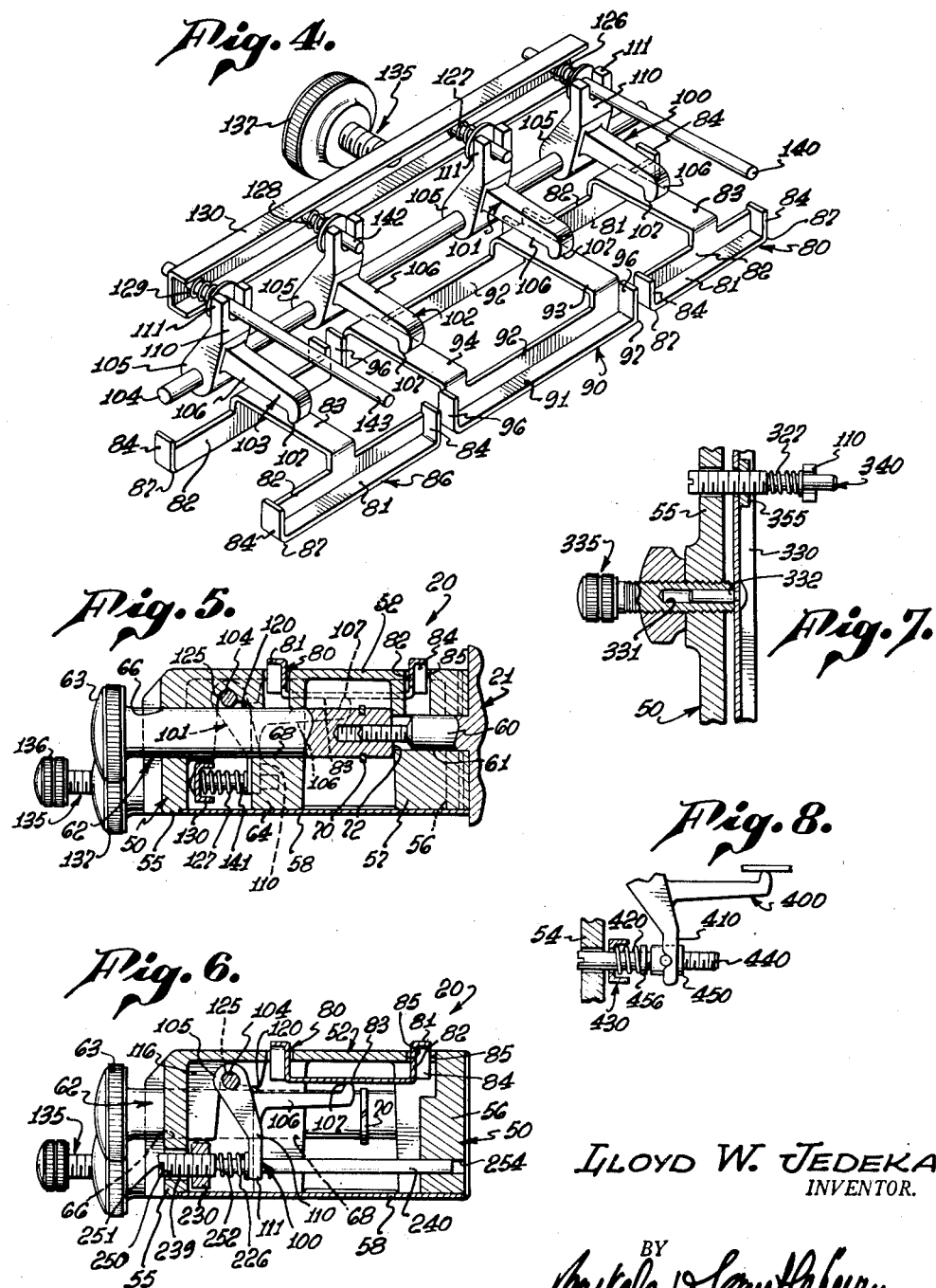

Patented Mar. 14, 1950

2,500,358

UNITED STATES PATENT OFFICE 2,500,358

PRESSURE SHOE STRUCTURE FOR KINETOGRAPHS

Lloyd W. Jedeka, Montrose, Calif., assignor to Mitchell Camera Corporation, Glendale, Calif., a corporation of Delaware Application July 14, 1949, Serial No. 104,685

11 Claims. (Cl. 88—17)

This invention is concerned generally with improvements in the film tensioning means (pressure shoes) of the type ordinarily associated with the film gate of a motion picture machine.

Among the primary objects of the invention are the provision of improved means for controllably varying the pressure applied to the film uniformly over the entire length of the film chute, and the provision, in certain embodiments of the invention, of independently operable means for varying the film tension at any one portion of the film chute without appreciably affecting the tension at other portions. Moreover, the invention permits both those types of adjustment to be made conveniently and while the machine is in operation.

The invention further provides tension controlling mechanism which is conveniently accessible and can be readily disassembled for cleaning or for the replacement of parts. In particular, the individual springs which determine the film tension at various portions of the film chute are independently removable without the use of any special tools, and hence can be quickly replaced if desired, either individually or as a group, by springs having different characteristics. That leads to a flexibility of operation which facilitates the optimum overall performance of the machine under a wide variety of operating conditions and with film having varying characteristics.

An understanding of the invention, and of its other objects and advantages, will be had from the following illustrative description of certain typical embodiments. Details of that description, and of the appended drawings which form a part of it, are not intended as a limitation upon the scope of the invention. For example, for clarity of description the film tensioning mechanism is here considered to be incorporated in a motion picture projection machine, but the invention can be used also in other kinetographic mechanisms, such as cameras, printers, etc. While the mechanism of the invention is preferably incorporated in the movable element of a film confining means, it will be understood that such mechanism can alternatively be mounted in the fixed portion, or can be associated with film guiding means which do not include any openable gate structure. Also, the mechanism is described as having the usual operating position with respect to gravity, but such terms as vertical and horizontal are used only for convenience of description and not by way of limitation. Similarly, other modifications and rearrangements of the structures here specifically described are intended to be included within the scope of the invention.

In the drawings:

Fig. 4 is a schematic perspective of the primary moving parts of the mechanism of the preferred embodiment of the invention;

Fig. 5 is a horizontal section on line 5—5 of Fig. 1;

Fig. 6 is a horizontal section showing a modification and taken as indicated by the line 6—6 of Fig. 1;

Fig. 7 is a fragmentary section taken in the same aspect as Fig. 1 and showing a modification; and Fig. 8 is a fragmentary section similar to Fig. 6 but illustrating a further modification.

Figure 1:
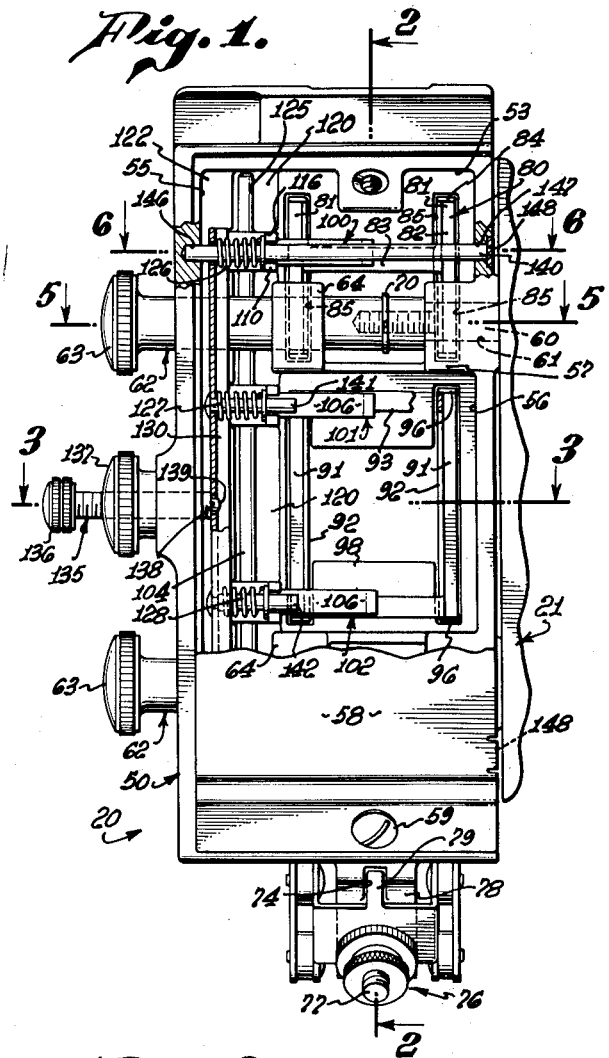
Fig. 1 is an elevation, partly broken away, of a preferred embodiment of the invention, looking along the optical axis toward the light source of a motion picture projection machine.
Figure 2:
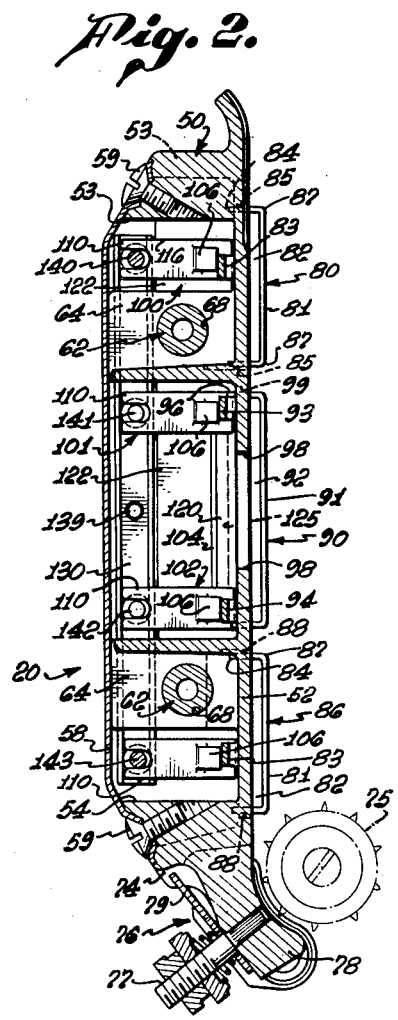
Fig. 2 is a vertical section on line 2—2 of Fig. 1.
Figure 3:
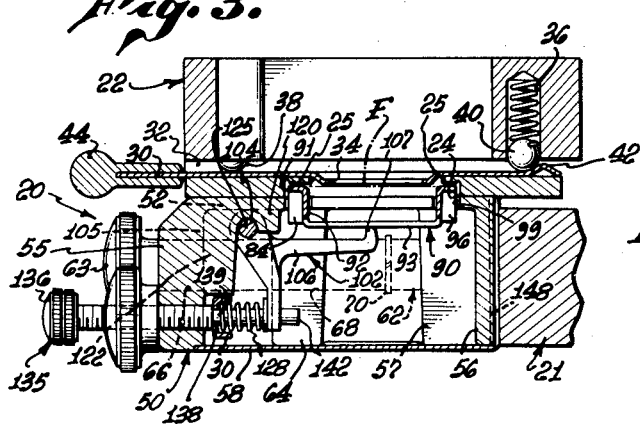
Fig. 3 is a horizontal section on line 3—3 of Fig. 1 and including in partially schematic form the film trap of the motion picture machine.

In the preferred modification illustratively shown in Figs. 1–5, the numeral 20 indicates generally a film gate. Film gate 20 is movable (downward as seen in Fig. 3, and to the left as seen in Fig. 2) away from the fixed portion or film trap 22, to provide access to the film chute 24, as for threading. As illustrated, the gate is rigidly secured to a gate carrier 21, which is movable, by means not shown, to open the gate. Releasable means, also not shown, is provided for holding the carrier and gate in the normal operating position of Fig. 3. Film chute 24 is defined primarily by a vertical channel in the face of trap 22, defining raceways 25, which receive and guide the film 26 past the opposing face of gate 20, as shown in Fig. 3.

An aperture plate 30 is removably mounted in film trap 22. The plate enters a horizontal channel 32 spaced back of vertical film chute channel 24. An embossed portion of the aperture plate projects forward into an aperture between the two channels. The picture aperture 34 is located in that embossed portion, and is spaced from, but immediately adjacent the film 26, where it can most effectively define the portion of the film to be projected. Aperture plate 30 is secured in a defined position in channel 32. The plate fits the channel accurately in its vertical dimension, and is pressed against the front channel wall nearest the film by three spring pressed balls which are mounted in bores in the rearward wall of the channel, as indicated at 36. Two balls, of which only one is seen in Fig. 3 at 38, engage the flat rearward face of the aperture plate near its outer end, one above and one below its horizontal axis. The third ball 40 is located on that horizontal axis near the inward end of the plate, and engages the slanting face of a lip 42, thereby urging the plate not only toward the forward face of the channel, but also further into the channel, so that handle 44 of the plate seats firmly against the outer wall of film trap 22, defining the longitudinal position of the plate in the channel.

The film gate itself comprises a frame or housing 50 which includes face plate 52, upper and lower end walls 53 and 54, outer side wall 55, and inner side wall 56. A cover plate 58 is removably secured to the housing by two screws 59, producing a closed chamber in which the film tension mechanism is principally housed. Gate 20 is rigidly but removably mounted on gate carrier 21 by means of two studs 60 on the carrier, which enter locating holes 61 in thickened portions 57 of inner gate wall 56 (Fig. 5). The ends of studs 60 are threaded and are received by the internally threaded inner ends of the elongated clamp knobs 62. Those clamp knobs fit loosely in bores 66 and 68 in outer gate wall 54 and in guide bosses 64, respectively, in which they are removably retained by snap rings 70. The outer ends of clamp knobs 62 carry knurled handles 63 which are conveniently accessible to the operator of the machine just outside outer gate side wall 55. When clamp knobs 62 are tightened on threaded studs 60, their inner end faces bear directly upon bosses 57 of inner gate wall 56, clamping the latter firmly and directly to gate carrier 21, without imposing any strain upon the gate frame as a whole.

Means for intermittently drawing film F through film chute 24 past aperture 34 are indicated partly schematically by intermittent sprocket 75 in Fig. 2, that sprocket being intermittently driven by any suitable means, such as a Geneva movement, not shown. The film is resiliently held in engagement with sprocket 75 by a sprocket pad 76, which is not in itself a part of the present invention. Sprocket pad 76 floats under adjustable spring pressure on a stud 77 mounted on a tongue 78 that depends from the lower end of gate frame 50. The rotational motion of the sprocket pad about the axis of stud 77 is accurately limited by the play of an arm 79, fixed on the pad frame, in a groove 74 in the gate frame, thereby insuring that the pad will engage sprocket 15 correctly when the gate is closed.

In each cycle of film movement, the film is accelerated downward by intermittent sprocket 75 and is then brought to rest in film chute 24 by film tensioning means which press the film against raceways 25 and thereby subject it to friction. To obtain smooth and satisfactory film action, that friction must be sufficiently great and correctly distributed along the length of the film chute to prevent the film from piling up as sprocket 75 comes to rest; and yet must not place an unnecessary drag on the film during its acceleration. As will be evident from the following description, the present invention permits more complete and more convenient control of the film tension, and particularly of its distribution along the length of the film chute, than has been previously available.

Film tensioning pressure is applied to film 26 in film chute 24 by a series of pressure shoes spaced longitudinally along the film, and pressing the film against raceways 25. Any suitable number of shoes may be provided, and these may have various individual structures and arrangements with respect to film aperture 34. In the present preferred embodiment three pressure shoes are employed, upper shoe 80, central shoe 90 and lower shoe 86. Upper shoe 80, for example, includes two flat rails 81, parallel to each other and to the plane of the film, longitudinal flanges 82 along the inner rail edges and normal to the plane of the film, a single transverse connecting bar 83 extending between flanges 82 and connecting the rails 81 to form an effectively rigid unit, and upstanding rail guide pieces 84 which form smooth continuations of rails 81 at both their ends. Connecting bar 83 lies inside gate housing 50, spaced from face plate 52. Rail flanges 82 project through slots 85 in the face plate and support the rail faces outside the gate housing in position to contact a film in film channel 24. Guide pieces 84 not only insure safe and gentle engagement between the film and the rail ends by providing smoothly curved surfaces 87 at those points, but project inwardly through slots 85 in face plate 52, thereby guiding the shoe. In particular, guide pieces 84, by contact with the sides and ends of slots 85, limit both the translational and the rotational movement of the shoe in a plane parallel to the film, thereby limiting rail contact with the film to the desired portions of the film adjacent its edges; but leave the shoe substantially free for floating movement transversely of the film plane. That movement is limited outwardly by contact of bars 83 with the inner surface of face plate 52.

Lower shoe 86, as illustrated, is substantially identical with the upper shoe, and its various parts are identified by the same numerals as the corresponding parts just described for the upper shoe. The lower shoe is set in slots 88 in face plate 52. The structure of central shoe 90 is similar, but differs from upper and lower shoes 80 and 86 in having two connecting bars 93 and 94 extending between the rail flanges 92 near their ends and effectively rigidly connecting the two flat rails 91. Guide pieces 96 are similarly formed and perform a dual function similar to that of guide pieces 84 of the upper and lower shoes, providing smoothly curved rail end portions 97 and limiting shoe movement parallel to the plane of the film by contact with suitable slots, as 99, in face plate 52. Those slots are preferably formed as extensions of light aperture 98, as indicated most clearly in Fig. 1. Outward motion of central shoe 90 is limited by contact of connecting bars 93 and 94 with the interior surface of plate 52 between slots 99 above and below light aperture 98 (Fig. 2).

Each of the pressure shoes is preferably formed from a single piece of sheet stock, suitably shaped and formed. Guide pieces 84 and 96 are preferably continuations of rails 81 and 91 respectively, for the reason already explained, and may be simply folded against the ends of rail flanges 82 and 92. Alternatively, the joints between flange ends and guide pieces may be made rigid, as by welding. An important advantage of the present preferred structure is the fact that the longitudinal flanges 82 and 92 greatly stiffen the rails, tending to prevent warping during heat treatment, and permitting a more precisely flat film contacting surface. Yet, with the construction shown, that advantage is obtained without adding to the expense or complication of manufacture.

Outward motion of the three pressure shoes is resiliently urged by spring pressed levers 100, 101, 102 and 103 which contact the midpoints of connecting bars 83 of upper shoe 80; 93 and 94 of central shoe 90; and 83 of lower shoe 86, respectively. As illustrated, all four of those levers are pivoted for free movement on the same rod 104, which is parallel to the film contacting rails of the pressure shoes, and to film chute 24. Each of those levers comprises a bell crank, having a body portion 105; an arm 106 extending from that body portion generally parallel to gate face 52 and terminating in a projecting tip 107 which defines the point of contact with the pressure shoe connecting bar; and a relatively shorter arm 110, extending from the body portion generally normally to gate face 52 and carrying a formation adapted for receiving spring pressure.

Each of levers 100—103 is independently rotatable about the axis of the common pivot rod 104. The body portions of the levers fit with movement freedom in recesses 116 formed in the vertical interior corner of gate housing 59, which is thickened along face plate 52 to form a low shelf 120, and along outer wall 55 to form a higher shelf 122. Recesses 116, as shown, extend throughout the cross section of both of those shelves (see, for example, Figs. 5 and 6). The axial position of the levers along pivot rod 104 is thus fixed by contact of the axial faces of their body portions with the shoulders of recesses 116.

Pivot rod 104 is mounted in the frame in an economical and convenient manner, providing, among other advantages, ready disassembly of the entire unit of rod and levers. The rod is received in a groove 125 in the face of lower shelf 120, immediately adjacent the base of shelf 122, as shown, for example in Figs. 5 and 6. Rod 104 is located axially by gate end walls 53 and 54, and is retained in groove 125 by clamp knobs 62. After disassembly of the spring mechanism (see below) the rod is immediately removable together with levers 100—103 upon removal of the clamp knobs from their bores, which requires only the release of snap rings 70.

Resilient pressure is controllably applied to the arms 110 of levers 100—103 by individual springs, which are illustratively shown as coil springs 126—129, respectively, acting in a plane parallel to that of face plate 52 and hence parallel to the plane of the film 26 (Fig. 3). Each coil spring acts between its associated lever arm 110 and a rail 130. The loading of all the springs is simultaneously adjustable by translational motion of rail 130 in the plane of action of the springs. Means are preferably provided for producing such translational adjustment of rail 130 without unduly restricting rail rotation in that plane of action. As illustrated, adjusting screw 135, carrying a knurled knob 136 at its outer end, is screw threaded in outer gate side wall 55, and engages a longitudinally central point of rail 130. A knurled lock nut 137 releasably locks screw 135 in its adjusted position. The inner, rail engaging end of screw 135 has an axially facing shoulder 138 which presses against the flat outer face of rail 130, tending to stabilize the rail against rotation about its own longitudinal axis. Screw 135 terminates beyond shoulder 138 in an axial defining pin 139, which freely enters a hole in the rail, limiting the relative motion of rail and screw in the plane of the paper in Fig. 2, and thereby maintaining screw engagement with the rail under the combined force of the four springs, but leaving the rail substantially free to rotate through at least a small angle in the plane of the spring action, which is the plane of the paper in Fig. 1.

Coil springs 126—129 are preferably guided by guide rods extending axially of the springs between rail 130 and the respective lever arms 110. Two types of such guide rods are illustratively shown in the preferred modification of Figs. 1–5. Guide rods 140 and 143, associated with springs 126 and 129 respectively, extend parallel to gate face 52 across the entire width of the gate housing from holes 146 (shown illustratively as blind holes) in outer gate wall 55 to holes 147 in inner gate wall 56. The rods are readily removable through wall 56 upon removal of cover plate 58, being normally retained in position by tabs 148 on cover plate 58, which extend into recesses in the exterior face of wall 56 and cover holes 147 (Fig. 1). The rods pass freely through holes near the ends of rail 130 and between the bifurcations 111 at the ends of arms 110 of levers 100 and 103 respectively, thus serving not only to guide springs 126 and 129, but also to maintain rail 130 in a plane parallel to gate face 52, while freely allowing translational rail motion parallel to the guide rods and also limited rotational rail motion in their plane about the inner end of adjusting screw 135. Spring guide rods 141 and 142 are rigidly mounted, as by riveting, on rail 130, extending from the rail axially of springs 127 and 128, respectively, and passing freely between, and only a short distance beyond, bifurcations 111 on arms 110 of levers 101 and 102, respectively.

Upon partial or complete removal of spring guide rods 140 and 143, in the manner already described, springs 126 and 129, respectively, are independently released and can be lifted out of the gate housing for cleaning or replacement. The remaining elements of the spring assembly, comprising rail 130, guide rods 141 and 142 and springs 137 and 138, are then immediately removable by withdrawing guide pin 139 from its seat in rail 130. That may be accomplished by backing off adjusting screw 135, or (if it is preferred not to disturb the adjustment of that screw) by moving rail 130 to the right as seen in Fig. 1, compressing springs 137 and 138, until the rail is clear of pin 139.

A further advantage of the structure described is the floating action of rail 130, whereby it is free to rotate through a small angle about guide pin 139 in the plane of Fig. 1. Such action tends to distribute the resilient load uniformly over springs 126 to 129, increasing their effective resiliency under operating conditions. Thus if an abnormally thick portion of film enters film guide 24, successively engaging the respective pressure shoes, each shoe is enabled to accommodate itself to the change in film thickness not only by the inherent resiliency of its associated spring or springs, but also by resilient movement of rail 130 which involves resilience of all the springs.

Alternatively, all four springs 126—129 may be guided by rods like 140 and 143 in fixed relation to frame 50, or by rods like 141 and 142 fixed on rail 130. In the latter instance, means other than rods 140 and 143 are preferably provided to maintain rail 130 in the correct plane. As seen, for example, in Figs. 2 and 3, that function can conveniently be performed by the face of shelf 122 which is parallel to that plane and immediately adjacent rail 130. The ends of lever arms 110 can be provided with other means, such as holes, instead of bifurcations 111, for receiving the guide rods, regardless of the manner of mounting the latter. However, particularly when the guide rods are mounted rigidly on rail 130, the illustrated structures 111 are preferred because the entire assembly of rail, springs and guide rods can then be disassembled as a unit by simply lifting it out of the gate housing after backing off adjusting screw 135. An important advantage of that ease of disassembly is that the springs can be replaced quickly and conveniently. That is useful both because of the possibility of breakage and to facilitate varying the spring constants of one or more of the springs in order to modify the film tensioning action of the mechanism in any desired manner beyond the capacity of the regular adjustment means provided. With spring guide means such as guide rods 140 and 143 mounted in the gate frame, replacement of individual springs is even simpler than by the method just described for guide rods mounted on the rail. After removing cover plate 58, each frame mounted guide rod can be independently removed through inner gate wall 56, releasing its associated spring without disturbing the rest of the mechanism in any way.

It will be understood that spring guide means may under some circumstances be dispensed with entirely. For example, with coil springs of suitable length and stiffness, the spring ends may simply be seated in defining recesses in the respective pressure receiving members. An individual spring may then be removed directly by compressing it enough to free one end from its recess. While coil springs acting under compression are preferred, springs of other types may be used, or coil springs can be arranged to transmit resilient force under tension from the translationally adjustable rail to the individually movable levers, those elements being rearranged accordingly in the gate housing.

Figs. 6–8 illustrate typical modifications of the structure shown in Figs. 1–5, by which provision can be made for individually and separately adjusting the pressure exerted by each pressure shoe against the film, while retaining the uniform adjustability of all pressure shoes simultaneously by a single control. As illustratively shown in Fig. 6, rail 230, corresponding to rail 130 of the modification of the preceding figures, is of solid rather than channel section. Spring guide rod 240 has an enlarged threaded outer portion 239 which is screwthreaded in a bore in rail 230. The outer end of rod 240 extends freely through an aperture 250 in outer side wall 55 of the gate housing and is therefore readily accessible to the operator. A tool receiving formation 251 is shown, by which the rod can be rotated to vary its axial position with respect to rail 230. Alternatively, a thumb nut or any other type of control formation can be substituted for 251. Spring 226, by which resilient force is controllably applied to lever 100, acts between arm 110 of the lever and a shoulder 252 on rod 240, that shoulder conveniently being formed at the inner end of enlarged rod portion 239. Thus the tension of spring 226 (for any given lever position) depends both upon the position of rail 230 in the housing, controlled by master adjusting screw 135 as before, and also upon the threaded position of guide rod 240 with respect to the rail, controlled by adjustable rotation of the rod by means of formation 251. In the modification of Fig. 6, spring 226 is releasable by simply backing off screw 239 until its threads become disengaged from rail 230, and then withdrawing rod 240 through the hole 250 in front wall 55 of the gate housing. Similar structures are preferably provided for individually adjusting the springs associated with levers 101, 102 and 103. Thus the pressure of each lever against its pressure pad bar is separately variable by adjustment of the individual screws such as 239; and the pressure of all levers is also variable simultaneously and substantially uniformly by adjustment of the single screw 135.

When it is required to make the tension adjustment of the springs at one end of rail 130 different from that at the other end, it is ordinarily preferable to prevent the rail from swinging about the end of screw 135 in the plane of Fig. 1, since such swinging or floating action tends to eliminate such tension differences. In the modification of Fig. 6, the rail is stabilized against such swinging by guiding action of spring guide rod 240. The inner end of that rod enters a bore 254 in inner gate wall 56, which is preferably thickened for the purpose as indicated in the figure. Rod 240 is freely movable axially in bore 254 to accommodate either its own adjustment relative to rail 230 or the adjustment of the rail and rod as a unit relative to the housing. But swinging motion of the rail and rod unit about any axis but that of bore 254 is prevented. As in the case of guide rods 140—143 of the previously described modification, the guiding function just described can be shared by all or by any number of the spring guide rods. Those rods not required to guide rail 230 may be cut off a short distance inside the lever arm 110 (see, for example rod 340 in Fig. 7).

An alternative manner of guiding rail 230 is illustrated in Fig. 7. That guiding means is shown in connection with a rail 330 of channel type, but is equally applicable with other types of rail and can also be employed if desired in a modification which does not involve individual spring adjustments (Figs. 1–5). As typically shown in Fig. 7, the main adjusting screw 335 is of larger diameter than corresponding screw 135 in Figs. 1–5, and has at its inner end, which bears against rail 330, an axial bore 331. A pin 332 is mounted on rail 330 with its axis rigidly defined with respect to the rail, and is received by bore 331. Rail 330 is thus maintained parallel to gate wall 54, its spacing from that wall being adjustably variable by rotation of screw 335.

Fig. 7 shows also an alternative manner of making the spring guide rods axially adjustable with respect to the rail. The threaded portion of rod 340 carries a square nut 355 which fits between the side flanges of channel rail 330, where it is held by the force of spring 327.

A further illustrative modication is shown in Fig. 8, in which the spring guide rod is adjustably related to lever 400 rather than to the rail 430. As shown, guide rod 440 is threaded into a sleeve 450 which is pivotally related to the bifurcated end of lever arm 410 by means of trunnion pins 452. Those pins are held by spring pressure in grooves 454 in the lever arm bifurcations, preventing sleeve rotation about the rod axis, but permitting ready disassembly. Spring 420 acts between rail 430 and a flange 456 which is rigidly mounted on guide rod 440 and transmits the spring thrust via the guide rod and pins 452 to lever 400. Spring guide rod 440 extends freely through a clearance hole in gate wall 54, and is accessible from outside the gate housing for adjustment of its threaded position with respect to sleeve 450 and lever arm 410. Rail 430 may be guided with respect to rotation in the plane of the spring action by means such as are shown in Fig. 7.

It will be understood that many other arrangements can be employed within the scope of the invention for independently varying the tension of the springs which act between the adjustable rail and the respective levers which actuate the pressure shoes. The specific embodiments described and illustrated herein are illustrative of the invention, but are not intended to limit its scope, which is defined by the following claims.

I claim:

1. In a kinetograph mechanism, film tensioning means comprising, a frame, means for guiding a motion picture film past the frame, a plurality of pressure shoes movably mounted in the frame for yielding contact with a face of the film at longitudinally spaced points thereof, a plurality of levers mounted in the frame for independent rotation about pivot axes parallel to the film, and adapted by virtue of such rotation to exert pressure upon the respective pressure shoes in a film contacting direction, an elongated pressure bar mounted in the frame generally parallel to the film and capable of movement in translation transversely of its length, a plurality of springs acting in the plane of movement of the pressure bar between the respective levers and longitudinally spaced points of the pressure bar, said springs tending to rotate the levers about their respective pivot axes, and manually operable means for controlling the said translational movement of the pressure bar to vary the tension of the springs.

2. Film tensioning means as defined in claim 1 and in which the said levers are mounted for independent rotation about a common pivot axis.

3. Film tensioning means as defined in claim 1 and in which the pressure bar is engaged by the said manually operable means at a single point intermediate its length, and is rotatable about that point in its said plane of movement in response to differential tension of the said springs.

4. In a kinetograph mechanism, film tensioning means comprising a housing having a face wall and a longitudinal side wall, means for guiding a motion picture film past the face wall in a direction parallel to the side wall, a plurality of longitudinally spaced pressure shoes movably mounted in the face wall for yielding contact with a face of the film at longitudinally spaced points thereof, a plurality of longitudinally spaced levers mounted in the housing for independent rotation about pivot axes parallel to the film, and adapted by virtue of such rotation in an actuating direction to positively move the respective pressure shoes in a film contacting direction, an elongated pressure bar mounted in the housing parallel to the side wall and capable of movement in translation transversely of its length in a movement plane generally parallel to the face wall, a plurality of springs acting between the respective levers and longitudinally spaced points of the pressure bar, said springs exerting resilient force upon the levers tending to rotate them about their respective axes in said actuating direction, and exerting resilient force upon the pressure bar tending to move it in translation, and manually operable control means extending through the side wall of the housing for positively moving the pressure bar in translation in opposition to the force of the springs.

5. Film tensioning means as defined in claim 4, and including a plurality of independently operable adjustment means for varying the tension of the respective springs independently of the position of the pressure bar, said adjustment means extending through the side wall of the housing.

6. Film tensioning means as defined in claim 5, and in which the said control means comprises a screw in threaded relation to the side wall and engaging the pressure bar at a point intermediate its length, and the said adjustment means comprise screws in threaded relation to the pressure bar, and having axial surfaces receiving the thrust of the respective springs, the side wall having apertures through which the screws are operable from outside the housing.

7. In a kinetograph mechanism, film tensioning means comprising a housing having a face wall and a longitudinal side wall, means for guiding a motion picture film past the face wall in a direction parallel to the side wall, a plurality of longitudinally spaced pressure shoes movably mounted in the face wall for yielding contact with a face of the film at longitudinally spaced points thereof, a plurality of longitudinally spaced spring means mounted within the housing and acting to urge the respective pressure shoes resiliently in a film contacting direction, manually operable control means for simultaneously varying the tension of the plurality of spring means, and adjustment means operable from outside the gate housing for separately varying the tension of each of the spring means independently of the condition of adjustment of the said control means.

8. Film tensioning means as defined in claim 7 and in which the said control means and the said adjustment means extend through the side wall of the gate housing.

9. In a kinetograph mechanism, film tensioning means comprising a housing having a face wall, two opposing longitudinal side walls, means for guiding a motion picture film past the face wall in a direction parallel to the side walls, a plurality of longitudinally spaced pressure shoes movably mounted in the face wall for yielding contact with a face of the film at longitudinally spaced points thereof, a plurality of longitudinally spaced spring guide rods extending transversely within the housing, a coil spring surrounding each of the guide rods, a longitudinal pressure member mounted for translational movement parallel to the transverse guide rods and engaging one end of each of the coil springs, means for transmitting pressure from the other end of each spring independently to one of the pressure shoes in a direction to urge it into film contact, control means for adjustably varying the translational position of the pressure member, apertures in one of the side walls coaxial with the respective spring guide rods and through which the guide rods are independently axially movable for independent release of their associated springs, and retaining means for releasably retaining the guide rods within the housing.

10. In a kinetograph mechanism, film tensioning means comprising a housing having a face wall, a removable cover plate for the face of the housing opposite the face wall, means for guiding a motion picture film past the face wall, a plurality of pressure shoes spaced longitudinally of the film and mounted in the face wall for yielding contact with a face of the film at longitudinally spaced points thereof, a plurality of longitudinally spaced spring guide rods extending transversely within the housing, a coil spring surrounding each of the guide rods, a longitudinal pressure member mounted for translational movement parallel to the transverse guide rods and engaging one end of each of the coil springs, means for transmitting pressure from the other end of each spring independently to one of the pressure shoes in a direction to urge it into film contact, control means for adjustably varying the translational position of the pressure member, the guide rods being independently axially movable with respect to the housing for independent release of their associated springs, and retaining means for releasably locking the guide rods against the said axial motion, the said retaining means being mounted on the cover plate and removable therewith to release the guide rods.

11. In a kinetograph mechanism, film tensioning means comprising a gate housing having a face wall and two opposing longitudinal side walls, means for guiding a motion picture film past the face wall in a direction parallel to the side walls, a gate support externally adjacent one side wall of the gate housing, two elongated clamp knobs in threaded relation with the gate support and having abutments adapted to clamp the said one side wall of the gate housing to the gate support, the clamp knobs extending transversely of the gate housing through apertures in its other side wall and being removable from the gate housing through those apertures, a pivot rod extending longitudinally within the gate housing between the clamp knobs and the face wall, abutments in the gate housing laterally adjacent the rod and determining its position in a plane parallel to the face wall, a plurality of longitudinally spaced pressure shoes movably mounted in the face wall for yielding contact with a face of the film at longitudinally spaced points thereof, a plurality of longitudinally spaced levers mounted on the said pivot rod for independent pivotal movement thereon and adapted by such movement in an actuating direction to exert upon the respective pressure shoes forces urging them into film contact, spring means engaging the respective levers and independently urging their respective pivotal movement in the said actuating direction, the pivot rod and the levers mounted thereon being releasable from the gate housing upon removal of the said clamp knobs.

LLOYD W. JEDEKA.

REFERENCES CITED

The following references are of record in the file of this patent:

UNITED STATES PATENTS

| Number | Name | Date |
|---|---|---|
| 1,037,325 | Roebuck | Sept. 3, 1912 |
| 1,270,866 | Power | July 2, 1918 |
| 2,204,884 | Brenkert | June 18, 1940 |
| 2,211,826 | Kindelmann et al. | Aug. 20, 1940 |